3,623,402
HYDRAULIC MOTOR DRIVE
Charles A. Kubilos, Oxnard, Calif., assignor to
Abex Corporation, New York, N.Y.
Filed July 6, 1970, Ser. No. 52,599
Int. Cl. F15b 11/08, 13/043
U.S. Cl. 91—421                                                                 13 Claims

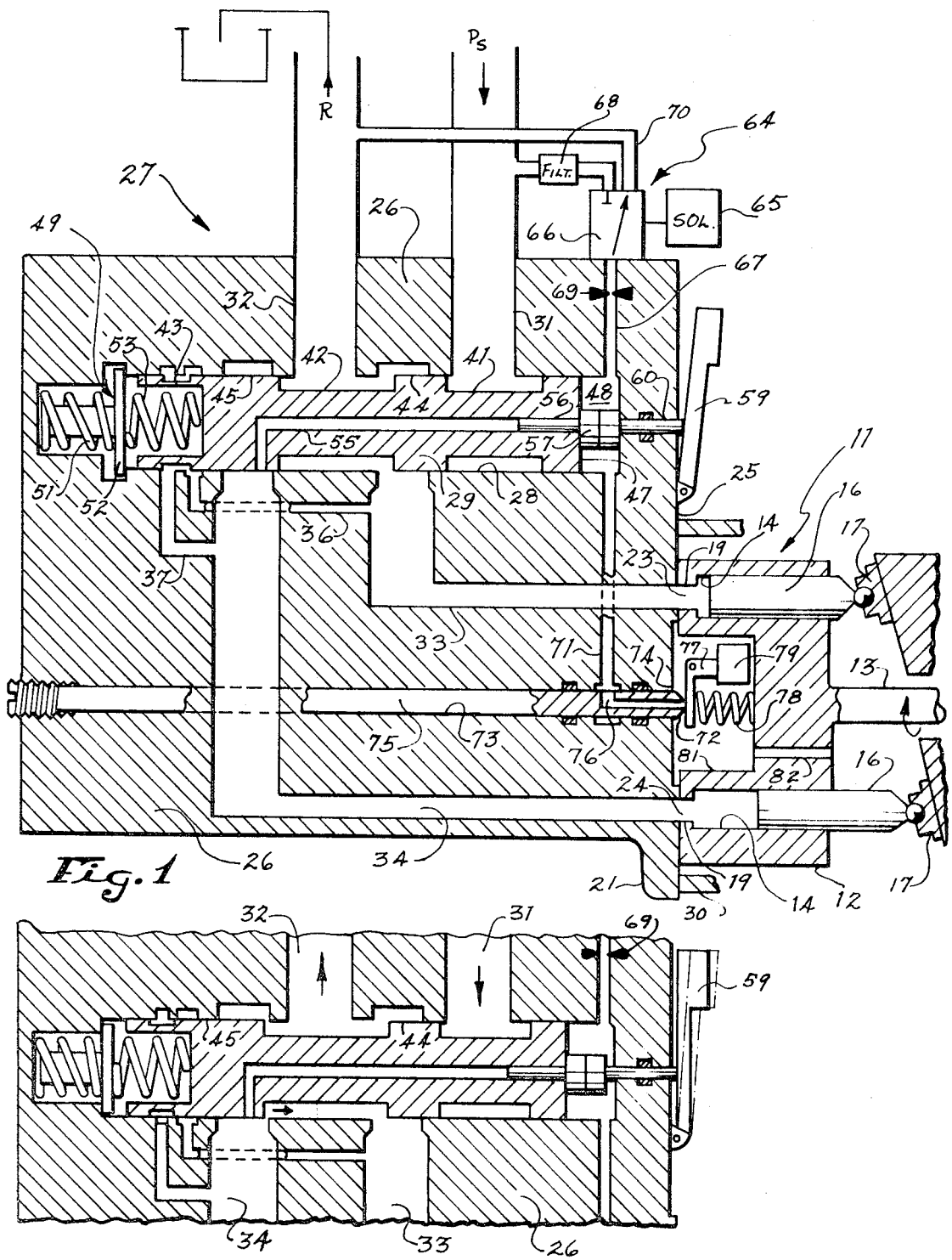

ABSTRACT OF THE DISCLOSURE

A hydraulic motor drive including a rotary motor and a pilot operated inlet-exhaust valve having a piston mounted therein and a pilot chamber controlled by a governor operated valve responsive to the rate of rotation of the rotary motor.

---

This invention is directed to a hydraulic motor drive having characteristics which render it suitable for use in operating multiple barrel weaponry of the "Gatling gun" type which are employed in modern aircraft. The relevant capabilities for such use are those of precise rate of rotation at one or more speeds which can be electrically selected; rapid acceleration to selected speed; controllable deceleration; automatic reversal of direction of rotation at the end of each firing cycle; override to permit motor freewheeling; and manual control permitting operation at an adjustable rate. These capabilities must be combined with minimum envelope in terms of dimensions and weight, and remote electric control. The drive can be used in other environments and for other purposes by reason of such features, however aircraft gun operation is presently the major field of use, and the invention is described hereinafter primarily in respect to that particular field. It will be understood that such reference is for purposes of explanation rather than limitation.

Gatling gun type armament is characterized by a plurality of sequentially fired gun barrels. The barrels are mounted so that their axes are parallel to one another and are arranged to form a cylinder which is driven to rotate about its central longitudinal axis. In firing, the assembly of barrels is rotated at a high rate of speed, for example, 3,000 to 6,000 r.p.m., so that the respective barrels are advanced sequentially to and through firing position, without stopping at the instant of firing. The barrels cool during the remainder of the cycle of revolution. Very high rates of firing can be achieved. The "Vulcan" cannon mounted on F104 aircraft is of this type.

The specifications for such use are severe. Minimum weight and compact size are critical; reliability is essential. Typically specifications call for an operating speed of 6,000 r.p.m. to be maintained within an accuracy of plus 8% minus 5%. The motor must reach the set speed very rapidly, typically within about a half a second. Deceleration must be rapid, and adjustable. After firing, it is desirable to have the option of rotating the barrels in the opposite direction for a brief period of time, in order to clear or fire any previously unfired shells remaining in any of the barrels.

The overriding problem in aircraft is not to provide the requisite functions, but to provide them in an assembly of minimal size and height. This invention is an especial advancement over the art in that respect.

In the motor drive of this invention a rotary hydraulic motor of the axial piston type may be combined in an integral assembly with the drive control. The drive control is preferably housed within the port block or end cap of the motor. The motor is controlled by a valve having a movable valve member which is selectively positionable to block or regulate the rate of flow from a pressure source to the motor inlet port, and to control or block the flow from the motor outlet port to a fluid receiver. In addition to its function in establishing and/or blocking a flow path through the motor to permit it to run or to cause it to stop the valve element is positionably responsive to a governor whereby a constant rate of motor rotation is maintained within close limits once the motor achieves the selected rate of rotation. Moreover, in closed position the spool completes a bypass circuit between the motor inlet and outlet ports and the fluid tank, so that the barrels can be rotated manually, for example in set up or maintenance.

The valve element is progressively movable between an open position in which it provides a path for the flow of fluid from a pressure source to the motor inlet port and a path for flow from the outlet port of the motor to a fluid receiver, and a closed position toward which it is biased. A control chamber including an endwise surface area on the valve element is exposed to pressure which acts oppositely on the valve element to the biasing means; that is, pressure in the control chamber tends to move the valve element toward open position. Fluid from a pressure source is supplied into the control chamber through a solenoid "off/on" valve or through a multiple output servovalve, which may be electrically controlled, and through a fixed area flow restrictor. An outlet line leads from the control chamber and includes a variable area flow restricting means which is operated by a governor responsive to the rate of rotation of the motor. The variable area flow restricting means is opened progressively when the rate of rotation of the motor increases beyond the set speed. As the rate of motor rotation increases, the governor opens the variable area restrictor downstream of the control chamber; flow thereupon starts through the control chamber and through both restrictors. The pressure in the control chamber is reduced by reason of the drop across the fixed area flow restrictor. This reduces the force tending to open the valve, and the movable valve element achieves a stable balanced position at which motor speed is accurately maintained. Deceleration of the motor is regulated by a piston which is mounted in the valve element. The piston is exposed at one end to the pressure fluid at the motor outlet port. It is exposed at an opposite end surface area thereof to the pressure of fluid in the control chamber. When the valve element, in moving to its closed position (upon deenergizing the solenoid or servovalve), it chokes or restricts flow of fluid from the motor outlet port to tank. The resulting rise in pressure at the outlet port acts on the piston, and an unbalanced reaction force acts on the valve element that resists and slows valve closure. This reduces the rate of deceleration of the motor to provide a further period of rotation useful for gun cooling after firing has stopped.

Other features and advantages of the invention can best be described by reference to the accompanying drawings in which:

FIG. 1 is a vertical longitudinal section, somewhat diagrammatic in nature, illustrating a preferred form of the invention as applied to a single speed motor;

FIG. 2 is a fragmentary view similar to a portion of FIG. 1 but shows the movable valve element as it is moving from open position toward closed position and decelerating the motor.

DETAILED DESCRIPTION

Figure 3:
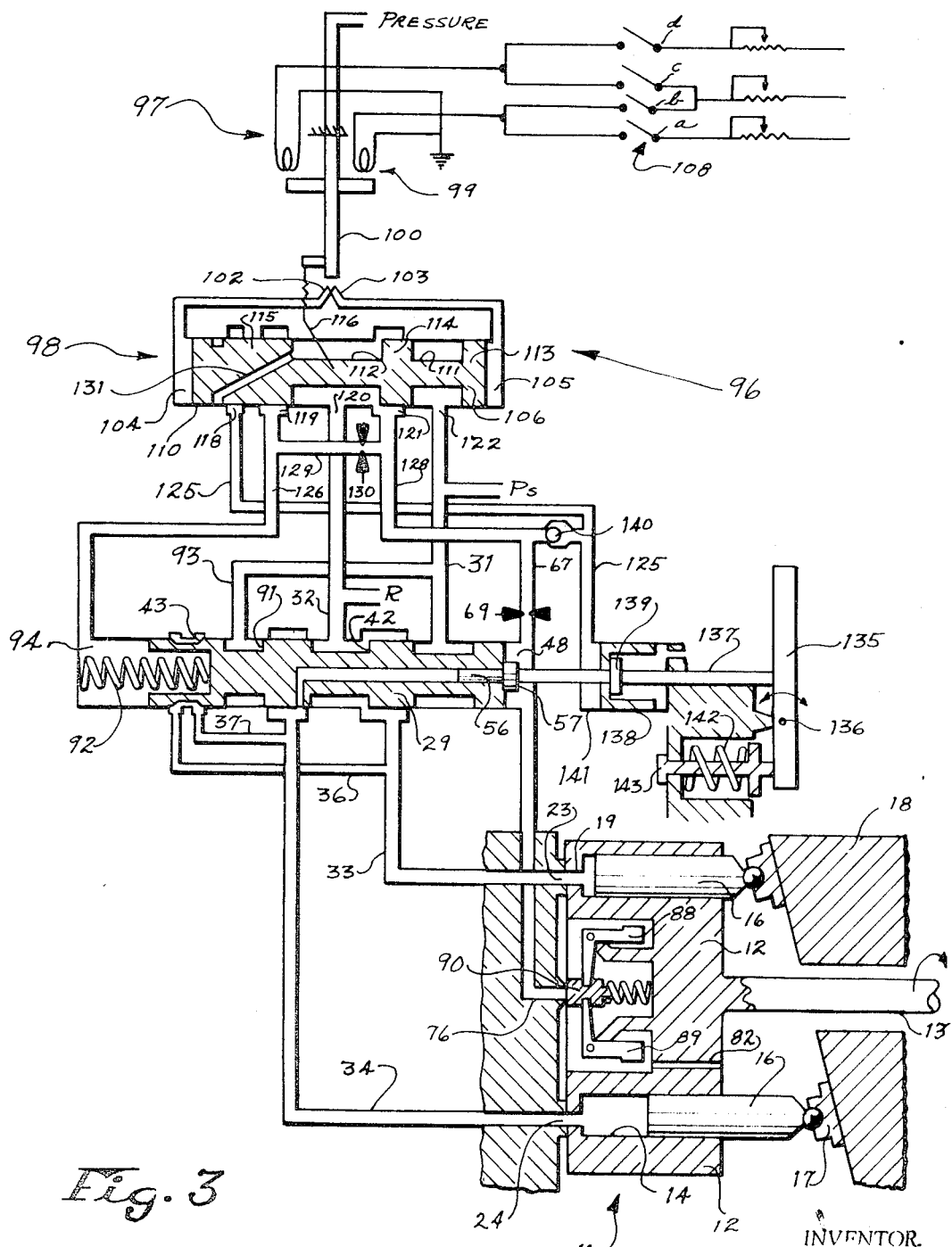
FIG. 3 is a vertical section, diagrammatic in form, of a three speed motor drive in accordance with the invention.

The motor drive shown for purposes of explanation in FIGS. 1 and 2 of the drawings can be controlled electrically or manually. When controlled electrically, it operates at a predetermined but adjustable rate of speed. When controlled manually it can be run at any desired speed within its operating range. The embodiment of FIG. 3 differs partly in that it can be controlled electrically to operate at any of three predetermined speeds. The embodiment of FIG. 3 also has the capability of manual operation.

In the drawings the hydraulic motor designated generally at 11 is preferably of the axial piston type and has a rotatable barrel 12 which operates a drive shaft 13. Barrel 12 contains a plurality of piston cylinders 14 in each of which a slidable piston 16 is received. Each piston 16 carries a shoe 17 at its outer end and the shoes bear slidingly against a tilted cam plate or swash plate 18.

A fluid passage 19 extends from the end or port surface 21 of barrel 12 to each piston bore 14. As barrel 12 rotates, the passages 19 communicate sequentially with an inlet port 23 and an outlet port 24 presented at a port surface 25 of a cap designated at 26. (The motor may have multiple inlets and outlets; one of each is shown for simplicity.) The cap conveniently can form the body for the control portion 27 of the motor drive assembly, and is secured to a motor body member 30 within which the barrel and cam plate are enclosed.

The control portion 27 in cap 26 has a bore 28, suitably closed at each end, in which a generally cylindrical valve element or spool 29 is movable in the axial direction. A pressure line 31 enters bore 28 and in use is connected to a source of pressure fluid indicated diagrammatically as $P_s$. A fluid return line 32 enters bore 28 at a position spaced from the opening of pressure line 31, and in use line 32 is connected to a fluid receiver, tank or reservoir designated as R in the drawing. In addition to the pressure inlet line 31 and the fluid outlet line 32, a line or passage 33 is also formed in cap 26 which communicates between bore 28 at a position between the entrance thereto of lines 31 and 32, and inlet port 23. Another line 34 communicates through cap 26 between outlet port 24 and bore 28, which it joins on the other side of the entrance of return line 32. By-pass passages 36 and 37 extend in cap 26 from lines 33 and 34 respectively to bore 28 which they join at spaced positions adjacent the left end of the bore. As will be explained, these lines are connected under certain conditions to provide a fluid by-pass or short circuit between lines 33 and 34.

The spool or valve element 29 in bore 28 is configured with three axially spaced circumferential grooves 41, 42, and 43, separated by lands 44 and 45. One end surface 47 of spool 29 (the right end surface as seen in FIGS. 1 and 2) is exposed to fluid pressure in a control chamber 48 pressure in which tends to move spool 29 to the left. At the other end the spool is urged toward the right by yieldable biasing means 49. In the preferred configuration shown in the drawing the biasing means 49 comprise a dual spring combination, a first spring 51 which bears at one end against the end of bore 28 and at the other end against a flange formed on a T-sectioned stop 52. Spring 51 when compressed thus urges stop 52 toward the right. A second spring 53 bears at one end against the right face of stop 52 and at the other end against spool 29. The two springs 51 and 53 together provide a dual force bias such that the biasing force urging spool 29 toward the right changes, depending upon spool position. When spool 29 is at its most leftward (or open) position, both springs are compressed and the biasing force is the larger of the individual forces. When the spool is at its right (or closed) position as shown in FIG. 1, spring 51 is bottomed out, spring 53 only acts on the spool and the biasing force is less.

The valve formed by spool 29 in bore 28 is shown in closed position in FIG. 1. In this condition no pressure fluid is applied to motor 12 and the motor is not energized but can turn inertially and can be rotated manually for testing. Spool groove 41 is in communication with pressure line 31. Land 44 blocks flow of pressure fluid from line 31 to line 33. Spool groove 42 provides a fluid path between line 33 and return line 42 so that inlet port 33 is connected to return. Land 45 closes line 34 and groove 43 in the spool providing communication between lines 36 and 37 so that the pressure in line 34 is equalized with pressure in line 33 and both are connected to the reservoir R through groove 42 and line 32.

An internal passage 55 is formed in spool 29 which opens at one end to the surface of land 45 and at the other end to spool control surface 47. A dual area piston 56 is slidably received in passage 55 and has a head or end surface area 57 of larger area than the piston shank, which head is exposed to pressure in chamber 48. At all spool positions passage 55 is in communication with line 34 and hence the small end surface area is exposed to pressure at the motor outlet port. It will be noticed that, as shown in FIG. 2, as spool 29 is moved from the leftmost or open position, land 44 blocks line 33 from pressure in inlet 31 and opens line 33 to return line 32, before land 45 closes or blocks outlet line 34 from communication with return line 32. That is to say, the application of pressure fluid to line 33 which tends to drive the motor is blocked before discharge fluid from outlet port 24 and flowing in line 34 to return line 32 is blocked.

The spool is axially positionable in bore 78 from the closed or no-run position shown to full open position by a manually operated lever indicated generally at 59. A stop, not shown, may be used to limit the lever and spool position, and hence the speed of motor operation.

Manual level 59 bears against and operates a push rod 60 having an inner end in control chamber 48 which can abut the head 57 of piston 56. A suitable seal around push rod 60 is provided to prevent loss of pressure in chamber 48. In absence of pressure in chamber 48, biasing means 49 holds spool 29 against rod 60, in the position shown.

Rotation of motor 12 is started and stopped electrically by a signal to a solenoid operated valve designated generally at 64. A solenoid 65 when energized positions a valve designated diagrammatically at 66 to establish a flow path between pressure line 31 and a control line or passage 67 communicating with control chamber 48. A filter 68 is preferably included in series with valve 66, to remove entrained dirt particles in fluid flowing into chamber 48. Line 67 includes a fixed area flow restrictor or orifice 69, the function of which is to establish a pressure differential proportioned to the rate of flow of fluid into chamber 48. In the solenoid-deenergized condition or mode shown in FIG. 1, line 67 is connected by valve 66 to a line 70 leading to the fluid tank or reservoir R. Under that condition chamber 48 is at tank pressure.

Fluid pressure is releasable from chamber 48 through a line or passage means 71 that includes a variable area flow restrictor or nozzle designated at 72. The area of restrictor 72 is controlled by a fly ball governor which is responsive to the rate of rotation of barrel 12, and is progressively opened as the rate of barrel rotation increases beyond a set speed determined by the force of governor biasing spring 78. A line 71 from chamber 48 intersects a bore 73 in cap 26 that is formed in alignment with the axis of rotation of barrel 12 and which extends to the port surface 25 of cap 26. A shaft 75 closes bore 73 and is threaded thereto at its outer end, and this shaft 75 has an axial internal bore 76 which extends to the right end of the shaft. Inwardly bore 76 is in fluid communication with line 71 in cap 26.

The fly ball lever 77 which is pivotally mounted to motor barrel 12 is urged by spring 78 to bear at one end against and close the outlet of bore 76 in the passage means leading from control chamber 48. A chamfer or taper 72 on the outer end of shaft 75 provides clearance for the movements of lever 77. When the motor is not rotating or is rotating at less than a predetermined speed, the variable area orifice 72 is closed and no flow is permitted from chamber 48 through line 71. In that case chamber 48 sees full inlet pressure. When the rate of motor rotation increases beyond the "set" speed, the centrifugal force acting on weight 79 of the governor, in combination with pressure force of fluid in passage 76, exceeds the force of spring 78 and restrictor 72 is progressively opened. Fluid is then released from passage 76 and a pressure drop across orifice 69 occurs, so that the pressure in chamber 48 is reduced. The governor chamber 81 in motor barrel 12 is connected through the barrel to fluid reservoir or tank through a drain line 82.

OPERATION OF SINGLE SPEED EMBODIMENT SHOWN IN FIGS. 1 AND 2

When solenoid 65 is in the deenergized condition, the solenoid controlled valve 66 blocks application of pressure into control chamber 48, and chamber 48 is at tank pressure. Spool 29 is held in its closed position under the force of the biasing mechanism 49. Pressure line 31 is blocked by land 44, and no pressure fluid is applied to the motor. The motor inlet and outlet ports 23 and 24 are in fluid communication with reservoir R through passages 36 and 37 and groove 43. Barrel 12 can be rotated manually, and any leakage fluid is drained.

Without electrical operation of solenoid 65, motor 11 can be manually controlled to operate by pushing lever 59. In practice it is contemplated that lever 59 may be mounted in the cockpit of the aircraft, and may be connected mechanically, hydraulically or electrically to exert force on push rod 60; in the drawing for purposes of illustration lever 59 is indicated as bearing directly on push rod 60. When lever 59 is operated, push rod 60 bears upon the head 57 of piston 56 which in turn bears upon the end surface 47 of spool 28, and moves the spool from closed position to an open position, compressing the biasing means at 49. Motor operation begins when the spool has been moved sufficiently to the left that a fluid flow path is provided from pressure line 31 through groove 41 into passage 33, and outlet port 24 is connected to the reservoir. The pressure differential between the inlet port 23 and outlet port 24 causes the barrel to rotate. Fluid discharged from the motor cylinders at outlet port 24 is returned to tank. (As previously indicated, passage 34 is opened to tank line 32 before the pressure line 31 is connected to the motor inlet port 23; hence flow through the motor can start as soon as spool 29 provides a path between the pressure line and motor inlet port 23.) The farther spool 29 is moved to the left by the lever the greater the flow from pressure line 31 to line 33, and consequently the higher the rate of rotation of the motor. (When pressure line 31 is connected to motor inlet port 23, spool 29 is at a position at which there is no communication between lines 36 and 37.)

When solenoid 65 is energized, motor 11 accelerates at a predetermined rate of speed which will depend upon the parameters of the particular system including pressure, torque, moment of inertia, and so on. Energizing solenoid 65 connects valve 66 so that pressure fluid is applied from the pressure source $P_s$ through filter 68, passage 67 and into chamber 48. Since the motor is initially at rest, the fly ball governor 77 holds variable orifice 72 closed at the start of operation, and fluid pressure in chamber 48 is not released. Pressure in chamber 48 acts upon the endwise control surface 47 of spool 29 and shifts the spool hard to the left. This fully opens the flow path through the motor as previously described. The motor accelerates at a rate depending upon the load inertia and the applicable pressure forces. When the motor reaches the set speed (determined by the screw adjustment of shaft 75 in bore 73), governor 77 progressively opens restrictor 72 and this releases fluid from chamber 48. The flow of make-up fluid into chamber 48 across fixed restrictor 69 drops the pressure in chamber 48, pressure becoming progressively lower as the speed of operation increases above set speed. Reduced pressure in chamber 48 reduces the leftward force on spool 29, and the spool is moved to the right under the influence of the biasing means 49 to a position reducing flow in line 33 and thereby slowing the rate of rotation of the motor. A balanced condition or steady state is achieved at which the motor runs without "hunting," at a precisely controlled speed at which the pressure force on spool control surface 47 exactly balances the rightward force of biasing means 49. Tests have demonstrated, for example, that motor speed can be maintained within a range of plus 8%, minus 5%. The operating speed is adjustable by turning shaft 75 into or out of bore 73; as a rule of thumb, threading shaft 75 into bore 73 increases the set speed.

When solenoid 65 is deenergized, chamber 48 is immediately connected to tank by valve 66. Spool 29 is thereupon shifted toward closed position by the biasing means 49. Spool 29 blocks the admission of fluid from pressure line 31 into the motor inlet port 23 through passage 33 before it blocks the release of fluid to line 32 from motor outlet port 24. The motor, having a high angular momentum by reason of its rotation, discharges fluid to line 34 while it coasts. Line 34 is partially blocked by land 45 of the spool, and consequently pressure in line 34 increases. This pressure acts through spool bore 55 on the end of piston 56 urging the piston to the right. This establishes a reaction force on spool 29 which urges the spool to the left against biasing means 49, and slows release of fluid from passage 34 to line 32 for controlled deceleration. The rate of deceleration is proportional to the force exerted on the spool by the biasing means 49, and the double spring arrangement 51, 53 changes the bias force on a particular spool position, so that a "dual regime" deceleration is established. Acceleration is initially rapid, when both springs are compressed, then is slower when only one spring is compressed. As fluid is released from passage 34 the pressure in that line decreases, the reaction force on spool 29 decreases, and the biasing force moves the spool to the closed position, in which passages 36 and 37 come into communication across groove 43, so that the pressure in passages 34 and 33 is equalized.

From the foregoing it can be seen that the drive of this invention utilizes the single spool 29 or valve in the motor flow path to regulate motor speed. In the drives which have previously been used for Gatling gun operation, a large first spool valve has been connected as a speed limiter for the accelerate and run functions, and a separate small spool valve has been required for manual control. Deceleration has been accomplished by a high flow relief valve. The advantage of this is that the single spool construction makes it feasible to build the main valve directly into the port cap 26. Hence, this construction is smaller and lighter which are of course important considerations for aircraft application.

THE MULTIPLE SPEED DRIVE OF FIG. 3

The multiple speed drive is similar in fundamental respects to the single speed controller described above but permits three speed operation with electrical speed selection, and establishes an optional clearing cycle whereby at the completion of firing or drive in the forward direction the drive stops, then reverses direction for a predetermined period. This reversal is desirable for clearing rounds remaining unfired in the barrels.

In the multiple speed configuration of FIG. 3, the motor portion 11 can be essentially similar to that previously described in relation to FIG. 1. However, while the governor 77 in FIG. 1 used a single fly ball lever, the construction shown in FIG. 3 uses two similar but opposite arranged fly ball levers 88, 89 each pivotally mounted to the barrel 12, and connected to a movable member or poppet 90 that is spring urged against the outlet of bore 76. It will be seen that other governor constructions can be used in place of either shown in the drawings.

The movable valve element or spool 29 of the three speed configuration is similar to that previously described in connection with the single speed embodiment, and also contains a fourth groove, designated 91, between grooves 42 and 43. Spool 29 is shown biased by a single spring 92 in place of a dual spring construction but it will be understood that this is optional and that the dual rate biasing means may or may not be used. A branch pressure line 93 communicates between pressure line 31 and groove 91.

In the single speed embodiment, the motor runs at a rate controlled by the position of spool 29 at which the pressure force in chamber 48 balances the force on the opposite end. The same is true in the multiple speed embodiment, but addition to the biasing force of spring 92, a biasing pressure force is applied in the spring chamber 94 and this pressure force acts upon the left end surface of spool 29 in combination with the spring force. Different valves of this biasing pressure establish different steady state positions of the spool, and hence different motion speeds.

Motor speed in the multiple speed embodiment is controlled electrically with a servovalve designated generally at 96. This servovalve may for example be of the type which is disclosed in detail in U.S. Pat. 2,884,907, issued May 5, 1959 to Raymond D. Atchley, to which reference is hereby made for more complete description. This servovalve includes a primary or pilot stage at 97 and a main or secondary stage at 98 controlled by the pilot stage. The pilot stage 97 may be of the "jet pipe" type shown in the previously identified Atchley patent and includes a torque motor 99 which exerts a torque to displace a tube or jet pipe 100. Pressure is supplied into one end of jet pipe 100 and issues as a jet or high velocity stream from a nozzle at the lower end of pipe 100, directed toward either or both of a pair of receiver ports 102, 103. The receiver ports lead to control chambers 104, 105 at opposite ends of the spool 106 of the secondary servovalve stage 98.

Torque motor 99 of the pilot stage 97 is electrically energizable and operates the secondary stage to establish a flow of pressure fluid through the secondary proportioned to the magnitude of the electrical current supplied to the torque motor. In the embodiment shown, the current applied to the torque motor can be selected from any four different magnitude—sign combinations, by closing switch 108a, b, c or d. Three switches connect conventional electrical circuitry, shown only partially, to provide currents of three different magnitudes and of same sign, corresponding to three different set speeds, and the fourth switch is connected to establish a current of opposite sign which operates the motor in the reverse direction.

Servovalve spool 106 slides in a spool bore 110, and has two circumferential grooves 111, 112 between lands 113, 114, and 115. A feedback spring indicated diagrammatically at 116 connects the spool to the lower end of the jet tube 100 (see the above described Atchley patent for a description in detail of feedback spring and its operation).

As previously indicated the receiver ports 102, 103 are connected by separate passageways to chambers 104 and 105 which are at opposite ends of spool 106 in bore 110. Five ports 118, 119, 120, 121 and 122 enter bore 110 at spaced positions in the side thereof. Port 118 is connected to a line 125. Port 119 is connected to a line 126 which leads to spring chamber 94 at the left end of the valve element 29. Port 120 constitutes a return port, and is connected to line 32 and to the return or reservoir R. Port 121 is conected to a line 128 which in turn is connected to line 67. Port 122 is the pressure port, and is connected to line 31 and to source of pressure fluid $P_2$. A line 129 which contains a fixed restrictor 130 is connected between line 126 and line 128.

Control chambers 104 and 105 of the second stage of the servovalve are sealed at all times by lands 115 and 113 respectively from each of ports 118–122. In the null, centered or closed position shown in the drawing, port 122 is in communication with groove 111, but land 114 closes that port from port 121. Port 121 is in fluid communication with groove 112 and through that groove with port 120. Port 119 is closed by the edge of land 115, and port 118 is closed by land 115. A diagonal bore 131 extends from the surface of spool 106 through land 115 to groove 112, and when spool 106 is shifted to the right from null position this bore 131 establishes a fluid path from port 118 to groove 112 and to return port 120 with which groove 112 is always in communication.

The manual means for controlling the drive unit include a lever 135 pivoted at 136 which operates a push or operating rod 137. Push rod 137 bears against the head 57 of piston 56 as in the embodiment previously described. Rod 137 also passes through piston means 138 and has a shoulder 139 which can be engaged by piston 138 to move the push rod to the right. Piston 138 is slidable in a cylinder 141 which is connected to line 125. On the opposite side of piston 138 cylinder 141 is connected to a fluid drain. It can be seen that when the lever 135 is turned in the counterclockwise direction about pivot 136, shoulder 139 bears against piston 138 and pushes the piston to the left, and also pushes spool 29 to the left, which, as will be seen, initiates operation of the motor 11. Line 125 is also connected to line 128 through a check or no-return valve 140 which permits flow of pressure fluid into line 125 from line 128, but prevents flow from line 125 into line 128. Application of pressure through line 125 causes piston 138 to move to the right thereby pushing shoulder 139 and push rod 137 to the right and turning lever 135 clockwise. Clockwise movement of the lever is opposed by a spring biasing means shown at 142. The biasing means includes a stop or limit rod 143 such that it exerts a counterclockwise torque on rod 135 only over a certain range of lever positions; at the other lever positions as when lever 135 is moved counterclockwise from the position shown in FIG. 3, biasing means 142 exerts no force on it.

OPERATION OF THREE SPEED EMBODIMENT

When none of the switches 108a, b, c, or d is closed, pressure fluid from jet tube 100 establishes equal pressures at ports 102 and 103 and hence in chamber 104, and 105, and spool 106 is in the null position shown. In that position pressure fluid in line 31 is blocked in the servovalve secondary stage by land 114, and control chamber 48 of the main spool 29 is connected to tank through line 67, line 128, port 121, groove 112 and tank port 120. In the absence of pressure in chamber 48, biasing means 92 holds the main spool 29 in the position shown, in which piston head 57 abuts push rod 137 and lever 135 is positioned by the end of spring biasing means 143. With the main spool 29 in the position shown pressure fluid in line 31 is blocked from the motor by land 42, and the motor inlet and outlet ports 23 and 24 respectively are pressure equalized through passages 36 and 37 which communicate through spool groove 43 and with tank through lines 33 and 32.

The motor can be controlled manually at any time by pushing lever 135 counterclockwise about pivot 136. The lever exerts a force through push rod 137 on piston head 57 and through the piston on spool 29 moving it to the left, and opening a path for fluid flow from the pressure inlet through line 31, groove 41 and line 33 to the motor. The motor outlet port 24 is connected to tank through line 34, groove 42 and line 32. Under manual control the fly ball governor does not limit the speed of operation of the motor, since chamber 48 is connected to tank.

The motor is controlled electrically by closing any of the switches 108a, b, c and d. The circuitry in which switch 108d is included is arranged to cause pressure to be exerted on the servovalve secondary stage spool 106 to move the spool to the right; each of the other switches 108a, b, and c are included in circuitry which causes the spool 106 to be moved to the left, and those switches control motor operation in the forward direction. Specifically, energizing any of the switches 108a, b, or c closes a circuit, energizing an electromagnet that exerts a torque on jet tube 100 which deflects it to the right, toward receiver port 103 and away from receiver port 102, thereby impressing a pressure differential in which the pressure in port 103 and chamber 105 is higher than the pressure in chamber 104. Spool 106 responds by moving leftward until feedback spring 116 exerts a counter or restoring force on jet tube 100 sufficient to bring the jet tube again to centered position, whereupon spool 106 stops. The amount of movement of spool 106 will depend upon the magnitude of the current, and in turn controls the rate of motor operation.

When spool 106 has been moved to the left, pressure fluid is applied from port 122 through groove 111 into port 121 and line 128 to line 67 and into control chamber 48. At the same time, leftward movement of spool 106 establishes a variable orifice between port 119 and land 115 to groove 112 and the return line. Fluid then flows in the circuit from $P_s$ port 122 to port 121, line 128, line 129 across fixed restrictor 130, line 126, port 119, to port 120 and return. Flow across the variable orifice at 119, 115, creates a reference pressure at port 119 which is reflected or seen at chamber 94.

At the start of motor operation, chamber 48 sees full inlet pressure, and spool 29 is moved hard left for rapid acceleration. As the motor sped reaches the set point, the governor releases fluid from chamber 48, and spool 29 moves right to a position in which the pressure force in chamber 48 just balances the opposing combined spring force and pressure force in chamber 94. The greater the current applied to the torque motor 99, the farther spool 106 of the servovalve is shifted leftward and the greater will be the opening of port 119 by land 115; and hence the smaller the reference pressure in chamber 94, and the more rapid the motor operation.

When the servovalve is deenergized it assumes a null position and the pressure in control chamber 48 which is then connected to tank port 120, drops to return pressure. Spool 29 moves to the right, opening motor inlet line 33 to return before it starts to close outlet line 34. As the outlet of line 34 starts to close and build up pressure, auxiliary piston 56 reacts to the pressure and holds the main piston 29 in position to regulate the outlet pressure. The area of auxiliary piston 56 and the preload on spring 92 determine the rate of declaration.

During acceleration and steady running cylinder 141 is exposed to pressure through line 128, check valve 140 and line 125. This pressure is high enough to move piston 138 to the right against its end stop and compressing lever spring 142. After the firing cycle, and during deceleration when servospool 106 is again at null, pressure fluid is trapped in cylinder 141, since check valve 140 prevents its release and land 115 blocks port 118. This maintains spool operating rod 137 in slightly retracted position. When deceleration is complete, spring 92 moves the spool 29 into contact with the retracted stop rod 137. At that spool position supply pressure is admitted to the normal outlet port 24 of the motor, from line 31, branch line 93, groove 91, to line 34. This causes reverse rotation of the motor until the servovalve is energized by closure of the appropriate switch to move spool 106 to the right. Such movement releases pressure in chamber 141 to tank, through line 125, port 118, diagonal bore 131, groove 112, and port 120. With release of the pressure in chamber 141, lever spring 142 moves the lever counterclockwise, returning valve element 29 to closed position, and this then shuts off the motor. In this connection, it will be noted that clockwise movement of lever 135 permits spool 29 to be moved to the right under influence of spring 92, again opening up the flow path for reverse operation of the motor. Hence the manual lever in this embodiment can be used to control the motor rotation up to maximum speed in either direction. Suitable stops not shown may be provided on lever 135 to prevent overspeeding.

In this embodiment, as in the single speed embodiment, motor flow is via the single valve element 29; the servospool 106 controls only a very small pilot flow, and hence can be much smaller in size than required to handle the full motor flow.

I claim:
1. A hydraulic motor drive comprising,
   a hydraulic rotary motor having an inlet port and an outlet port,
   a selectively operable valve having a valve element movable between a closed position in which it blocks the flow of fluid through said motor from a pressure source, and an open position in which it provides a path for flow from a pressure source to said inlet port and from said outlet port to a fluid receiver,
   biasing means acting on said valve element,
   a control chamber in which pressure acts oppositely to said biasing means on said valve element,
   passage means including variable area flow restricting means and communicating with said control chamber, the area of said variable area flow restricting means regulating the pressure of fluid in said control chamber,
   governor means controlling the area of said variable area flow restricting means, said governor means being responsive to the rate of rotation of said motor progressively to change the flow area of said variable area flow restricting means as the rate of rotation of said motor is increased beyond a set speed, and
   a piston mounted in said valve element, said piston exposed on one end surface area thereof to the pressure of fluid at said outet port, and exposed on an opposite end surface area thereof to pressure of fluid in said control chamber to effect a reaction force on said valve element.

2. The drive of claim 1 wherein said variable area flow restricting means is in passage means leading from said control chamber to a fluid receiver,
   said drive further including a control line for supplying fluid from a pressure source to said control chamber, said control line including a flow restrictor,
   said governor means including a fly ball lever one end of which is biased against an outlet in said passage means providing said variable area flow restricting means, said fly ball lever progressively opening the area of said last-named outlet as motor speed increases.

3. The drive of claim 2 wherein said last-named outlet is presented by a shaft axially adjustable toward and away from said lever.

4. The drive of claim 2 wherein said lever is pivotally mounted in a rotating member of said motor.

5. The drive of claim 1 wherein said valve element in closing blocks flow of fluid to said inlet port from a pressure source before it blocks the flow of fluid from said outet port to a fluid receiver.

6. The drive of claim 1 which further includes passages defined in part in said movable valve element through which said inlet port, outlet port and receiver are connected when said movable element is in closed position.

7. The drive of claim 1 which further includes a lever operable to exert an opening force on said valve element in opposition to said biasing means.

8. The drive of claim 1 which further includes piston means operating a stop against which stop said biasing means positions said valve element in closed position, which piston means when energized moves said stop to a second position, and further wherein said valve element when moved to abut said stop in said second position provides a path for reverse flow through said motor.

9. The drive of claim 8 which further includes means including a check valve and applying pressure to energize said piston means while said valve member is in said open position and to prevent release of pressure energizing said piston means with release of pressure in said control chamber.

10. The drive of claim 1 which further includes electrically operable means establishing a reference pressure which acts on said valve element in addition to said biasing means, said electrically operable means establishing the value of said reference pressure in accordance with the magnitude of an electrical current supplied to said electrically operable means.

11. A hydraulic motor drive including a hydraulic circuit operating a hydraulic rotary motor, said circuit including a valve having a movable valve element biased toward a no-run position and exposed at an unbalanced area thereof to pressure in a control chamber tending to move said valve member in a direction increasing flow from a pressure source through said motor to a fluid receiver, a pressure inlet to said chamber including a flow restrictor, a fluid outlet from said chamber including a variable area flow restrictor, a governor responsive to rotation of said motor to open said variable area flow restrictor as speed increases, a piston mounted in said valve element for movement relative thereto, said piston having an end portion exposed to pressure at the outlet of said motor which pressure tends to move said piston in the same direction as said biasing means to effect a reaction force on said valve element, and said piston having an opposite portion exposed to pressure in said control chamber.

12. The hydraulic motor drive of claim 11 which further includes electrically controllable means establishing a pressure force acting with said biasing means to urge said valve element toward said no-run position.

13. The drive of claim 12 wherein said electrically controllable means comprises a jet pipe-type servovalve responsive to a signal to charge flow across pilot flow restricting means, and passages reflecting the pressures across said pilot flow restricting means in chambers on opposite endwise portions of said element.

References Cited

UNITED STATES PATENTS

| | | | |
|---|---|---|---|
| 2,153,381 | 4/1939 | Maas | 137—58 |
| 2,931,342 | 4/1960 | Oldenburger | 91—458 X |
| 3,429,231 | 2/1969 | Raymond | 91—503 X |
| 3,437,015 | 4/1969 | Kubilos | 91—499 X |

MARTIN P. SCHWADRON, Primary Examiner

I. C. COHEN, Assistant Examiner

U.S. Cl. X.R.

91—427, 458, 459, 461, 499; 137—58